(12) United States Patent
Bidiville et al.

(10) Patent No.: US 8,188,974 B2
(45) Date of Patent: May 29, 2012

(54) INPUT DEVICE WITH REDUCED FRICTION

(75) Inventors: Marc Bidiville, St. Roman (MC); Tim O'Sullivan, Bantry (IE); Denis O'Keeffe, Newmarket (IE); Darragh Luttrell, Glanmire (IE); Martin Gleeson, Knockraha Village (IE); Neil O'Connell, Cork (IE); Jacques Antoine Dayer, Préverenges (CH); Antoine Merminod, Gimel (CH)

(73) Assignee: Logitech Europe S.A., Morges (CH)

( * ) Notice: Subject to any disclaimer, the term of this patent is extended or adjusted under 35 U.S.C. 154(b) by 1061 days.

(21) Appl. No.: 11/440,291

(22) Filed: May 24, 2006

(65) Prior Publication Data
US 2007/0069088 A1    Mar. 29, 2007

Related U.S. Application Data

(60) Provisional application No. 60/722,648, filed on Sep. 29, 2005.

(51) Int. Cl.
*G06F 3/033* (2006.01)
(52) U.S. Cl. ......................... 345/163; 345/156
(58) Field of Classification Search ........... 345/156–184
See application file for complete search history.

(56) References Cited

U.S. PATENT DOCUMENTS

| | | | |
|---|---|---|---|
| 4,595,070 A | 6/1986 | Hodges | |
| 4,797,665 A | 1/1989 | Ida et al. | |
| 4,868,549 A * | 9/1989 | Affinito et al. | 345/164 |
| 4,928,030 A | 5/1990 | Culp | |
| 5,555,894 A * | 9/1996 | Doyama et al. | 600/595 |
| 2006/0001657 A1* | 1/2006 | Monney et al. | 345/184 |
| 2006/0061558 A1* | 3/2006 | Grant et al. | 345/184 |
| 2006/0146096 A1* | 7/2006 | Wright et al. | 347/68 |

FOREIGN PATENT DOCUMENTS

| | | |
|---|---|---|
| DE | 3603526 A1 | 8/1986 |
| DE | 4400790 A1 | 5/1995 |
| DE | 20220179 U1 | 9/2003 |
| DE | 202004015041 U1 | 12/2004 |
| FR | 2544529 A1 | 10/1984 |

OTHER PUBLICATIONS

Office Action Received for German Patent Application No. 102006045112.0, mailed on Jul. 26, 2010, 4 pages of Office Action and 4 pages of English Translation.
"Office Action Received for German Patent Application No. 102006045112.0, mailed on Jan. 14, 2009", 5 pages.

(Continued)

*Primary Examiner* — Alexander Eisen
*Assistant Examiner* — Christopher E Leiby
(74) *Attorney, Agent, or Firm* — Kilpatrick Townsend & Stockton LLP

(57) ABSTRACT

A system and method for controlling friction between a mouse and the surface upon which it is placed. Reduction of friction can be accomplished in several ways, including: making the feet of the mouse from various different materials, creating layers of air between the mouse and the surface, creating beveled edges for the feet of mouse, etc. In one embodiment, the feet of the mouse are made of a piezo-electric layer bonded to another layer made of a different material. Exciting the piezo-electric layer at certain frequencies makes the two layers shrink and expand differently, thus creating oscillations of the feet. In yet another embodiment, portions of the mouse feet are made of different materials with different coefficients of friction. These different portions of the feet can be pressed down onto the surface with varying amounts of pressure, thus altering the friction.

15 Claims, 14 Drawing Sheets

OTHER PUBLICATIONS

"Office Action Received for German Application No. 102006045112.0, mailed on Apr. 3, 2007", 7 pages.

Wiedendanger, Markus "Squeeze Film Air Bearings Using Piezoelectric Bending Elements", 1-133 Pages, 2001.

* cited by examiner

VELVET OR BRUSH

INPUT DEVICE WITH REDUCED FRICTION

CROSS-REFERENCES TO RELATED APPLICATIONS

This application claims the benefit of, and priority under 35 USC §119(e) to U.S. Provisional Application No. 60/722,648, filed on Sep. 29, 2005, entitled "Gliding Mouse", which is hereby incorporated by reference in its entirety.

BACKGROUND OF THE INVENTION

1. Field of the Invention

This invention relates generally to input devices, and in particular to reducing friction in input devices.

2. Description of the Related Art

Over the last few decades, the use of computers, and their accompanying input devices (such as mice, trackballs, keyboards, etc.) has become pervasive. The use of several input devices is based upon the movement of the input device itself (e.g., in the case of mice), or upon the movement of some part of the input device (e.g., in the case of trackballs).

Let us consider, in particular, the movement of the part of an input device that controls the movement of a cursor on the screen of an associated display. For example, for a mouse this is the movement of the mouse over a work surface (e.g., a mouse pad, the top of a table, etc.). For a trackball, this would be the movement of the rotating ball relative to its housing. Such movement necessarily involves some friction due to the area of contact between the mouse and the work surface. Such friction increases the effort expended by the user in moving the cursor from one position to another.

Moreover, such friction reduces both the speed of the user's actions as well as the precision of his positioning of the cursor. Further, such friction results may result in more noise when the mouse is moved over the work surface. Reducing friction improve mouse gliding and precision. Further, this helps in reducing/eliminating slip stick—the effect caused by the difference between static and dynamic friction. For these and other reasons, reducing and/or controlling this friction significantly enhance the user experience.

It should be noted, however, that some friction is necessary for some purposes. For instance, a user would not be able to perform the much-used action of double clicking if he were unable to click on the same spot twice (that is, if, due to lack of friction, the mouse moved between the two clicks). Another example is that when the input device is not being used, the input device should not move away from where the user had left it, due to a lack of friction. Thus it is important to control the amount of friction at different times (e.g., depending on the current usage of the mouse).

In conventional devices available today, some steps have been taken to reduce the friction between the mouse and the work surface. Several mice currently on the market use small pieces of low friction materials (such as High Molecular Weight Poly Ethylene (HMWPE), Poly Tetra Fluor Ethylene (PTFE), or Teflon) glued onto the areas of the mouse which come into contact with the work surface (often the "feet" of the mouse on the bottom case). Depending on the material of the work surface and its condition, the friction and the noise between the mouse and the work surface are variable. Further, after some time of use, the feet of a mouse become scratched and friction and noise increase. This is due to the presence of materials like dust, sand, etc. which interfere with the low friction materials used for the feet. Over time, the apparent friction between the work surface and the mouse increases significantly.

None of the conventional devices implement reduction of friction in an effective manner that lasts over time. Further, none of the conventional devices provide the ability to control the friction between the mouse and the work surface at different times and/or under different circumstances.

Thus what is needed is a method and system for effectively reducing the friction between an input device and the work surface. In addition, there is need for a method and system for reducing noise generated by such movement. Further, there is a need for an intelligent management of the reduction of friction, so that lack of friction does not become problematic.

BRIEF SUMMARY OF THE INVENTION

The present invention is a system and method for reducing/controlling friction generated by the movement of an input device over a work surface, or for reducing/controlling friction generated by a moving part within an input device that controls cursor movement on an associated display. In one embodiment, an intelligent algorithm determines when to reduce friction.

Various embodiments of this invention cover many different solutions that can be used alone or in combination to reduce dynamic and/or static friction. Some embodiments are optimized combinations of materials. Better materials lead to better control of both sides of the friction, as well as noise reduction. Combinations of various materials can be used to create the feet of the mouse. Other embodiments include beveled edges of the feet of the input device.

Other embodiments create a lubricating layer between the surfaces in contact so that friction is significantly reduced (or even cancelled). The ways to create this layer are numerous. Some inject pressurized air at the interface the flow of air preventing the two surfaces to touch each other. Still other embodiments involve creating vibrations (either in the input device itself and/or in the work surface). In one embodiment, such vibrations trap a layer of air which reduces friction.

Yet other embodiments create a lift force that prevents the mouse from touching the table, even when the user has her/his hand's weight added to the own mouse weight. In some cases, the lifting force decreases sharply when the distance to the table increases, resulting in a small but relatively stable distance to the tracking surface. Some embodiments of the present invention, with air injected between the mouse and the surface follow this behavior. When the gap is small, the air cannot escape easily and pressure builds up. But as soon as the gap increases, the escape path for the air becomes larger and pressure drops.

Another embodiment includes an intelligent algorithm for appropriately controlling friction as required by the circumstances. For instance, when the user desires to double-click at a particular point on the display using the input device, larger friction between the input device and the work surface may be needed. Also, for use in various gaming environments, more or less friction may be desirable. In one embodiment, power is applied to mouse feet made of piezo-electric materials to create oscillations. The applied power can be altered to dynamically control the amount of friction between mouse and the surface. In another embodiment, mouse feet are made up of various different materials with different coefficients of friction. These different portions can be pressed against the surface with varying degrees of pressure (or lifted up from the surface altogether) to dynamically alter the amount of friction between the mouse and its surface.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE INVENTION

The figures depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein. Please note that as used herein, "mouse" can include conventional mice, optical mice, trackballs, etc. Further, the present invention can be used with any devices which need to be moved around continually (e.g., to control cursor movement). Thus while the ensuing discussion focuses on mice, embodiments of the present invention can be used with other such devices. Furthermore, "table", "surface", and "work surface" may be used interchangeably, and are considered to include any surface on which the input device may be used, including a mouse pad.

Figure 1A:
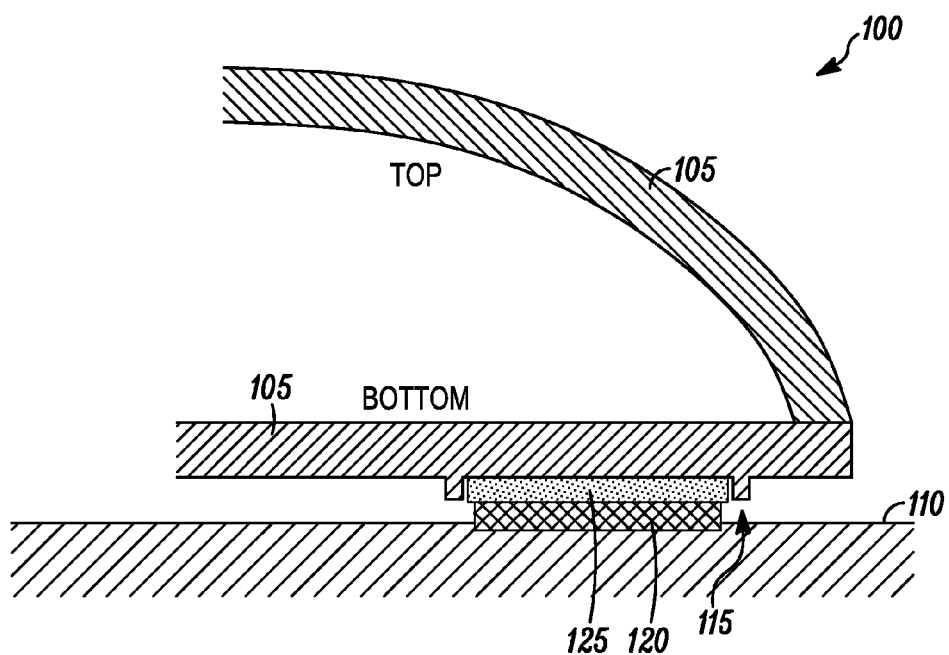
FIG. 1A illustrates a side view of a portion of a mouse in accordance with an embodiment of the present invention.

FIG. 1A illustrates a mouse in accordance with an embodiment of the present invention. A portion of a mouse 100 is shown, where mouse 100 has a housing or case 105, and is in contact with a work surface 110. A foot 115 of the mouse is made of a layer of foam 125 and a layer of low-friction material 120. Material 120 is a low friction material known in the art, such as High Molecular Weight Poly Ethylene (HM-WPE), Poly Tetra Fluor Ethylene (PTFE), or Teflon.

A layer of soft, noise-absorbent material 125 is added between the low friction layer 120 and the mouse 100. An example of material 125 is foam. Adding a layer of such a material 125 between the mouse case and the friction layer has several advantages. Such advantages include a very good noise reduction effect, since the foam prevents the vibrations from the feet 115 from reaching and being transmitted by the entire mouse 100. In one embodiment, the foam layer 125 also helps in aligning the surfaces. For instance, when there are more than three feet on a conventional mouse, only three of those feet actually touch the work surface 110. The foam 125 allows slight deformations that make all four feet touch (and prevent the mouse from rocking). Moreover, the foam layer 125 also helps in touching the entire mouse foot to the work surface, which reduces vibrations, instability, and wear. Further, in one embodiment, the foam layer 125 will also absorb the small height differences between feet.

Figure 1B:
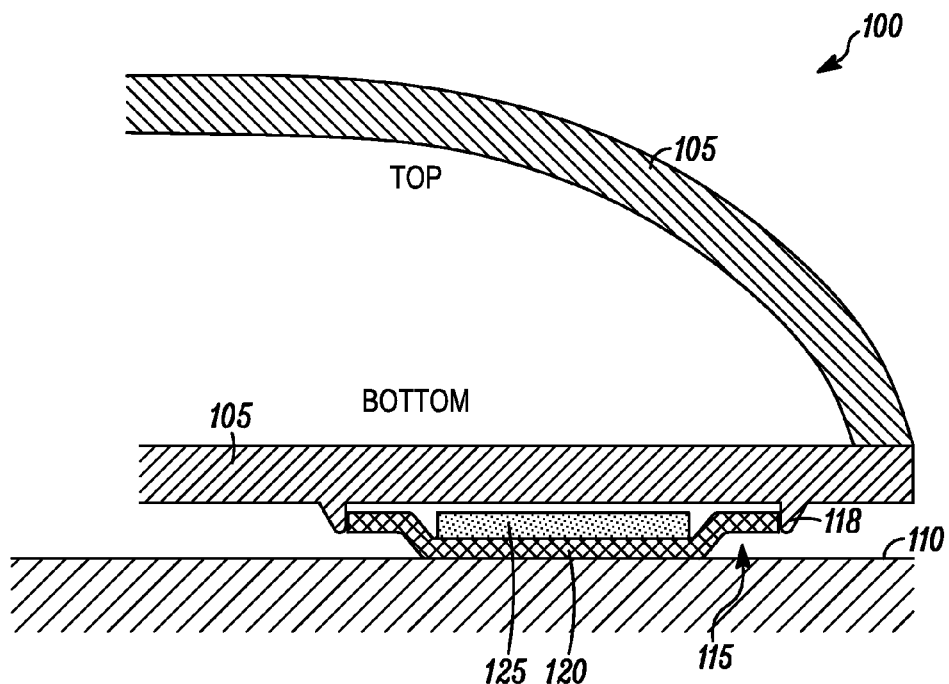
FIG. 1B illustrates a side view of a portion of a mouse in accordance with an embodiment of the present invention.

FIG. 1B illustrates a mouse in accordance with an embodiment of the present invention. The embodiment is similar to the one illustrated in FIG. 1A, but the low friction material 120 is slightly larger than the foam 125. This allows the low friction material 120 to protect the edge of the foam 125 and reduce the risks of de-lamination. The area of the mouse feet has to be increased to keep the same surface in contact with the table. A larger area makes the movement smoother when moving across an irregular surface.

Figure 1C:
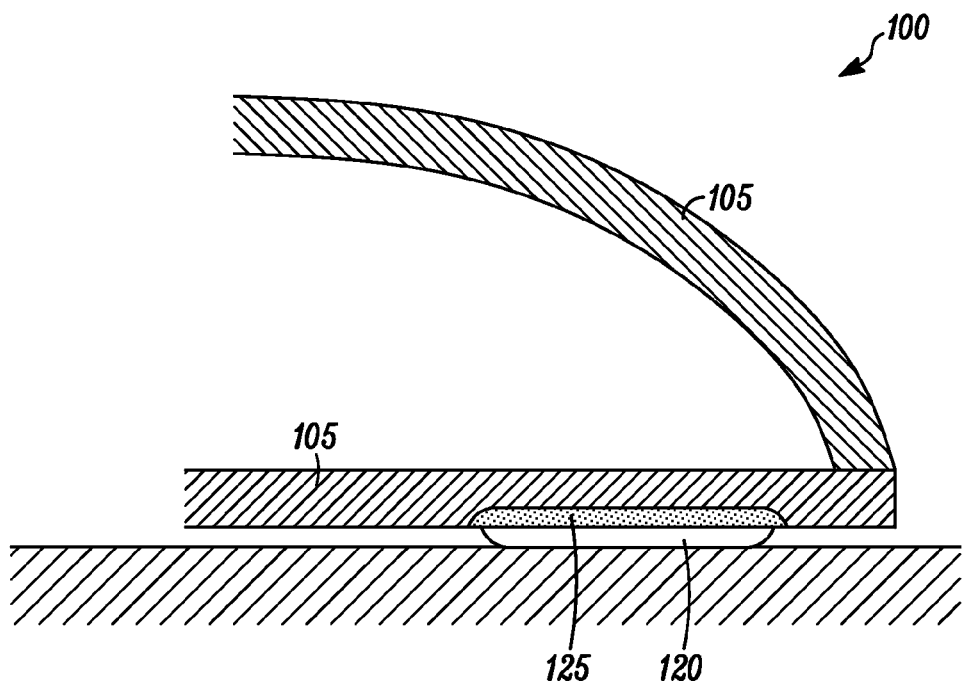
FIG. 1C illustrates a side view of a portion of a mouse in accordance with an embodiment of the present invention.

FIG. 1C illustrates another embodiment in which friction between the mouse 100 and the work surface 110 is reduced, and where foam is used. In one embodiment, matching materials are used for the mouse pad 110 and the feet 115 to minimize friction. For example Teflon on Teflon, or glass on glass could be used. In one embodiment, two hard materials in contact are used to reduce friction. In one embodiment, the surfaces in contact have to be smooth. However, in doing so, there is a significant risk that the movement will generate noise. As mentioned above, in one embodiment, the noise is kept under control by adding a layer of soft material (foam for example) 125 between the foot 115 and the rest of the mouse 100, preventing vibrations from being transmitted and radiated by the entire mouse case. In one embodiment, the glass at the foot edge is rounded/beveled so that it does not scratch the table surface. Thus friction is further reduced. One possible material for part of the mouse foot 115 is glass which can be polished to very smooth finish and is hard enough to prevent scratching on most table tops. Other examples of materials that can be used include sapphire, hard steel and similar materials. The glass layer is thick enough to have the edges of the foam well protected by the ribs 118 on the case bottom. The ribs 118 can be seen in FIG. 1B, and appear in the figure as small protrusions that indicate where the foot 115 has to be placed. The ribs 115 also prevent the glass and foam stack from slipping out of position when using the mouse. In one embodiment, rib 115 is a ring all around the foot, showing its external shape.

Figure 2:
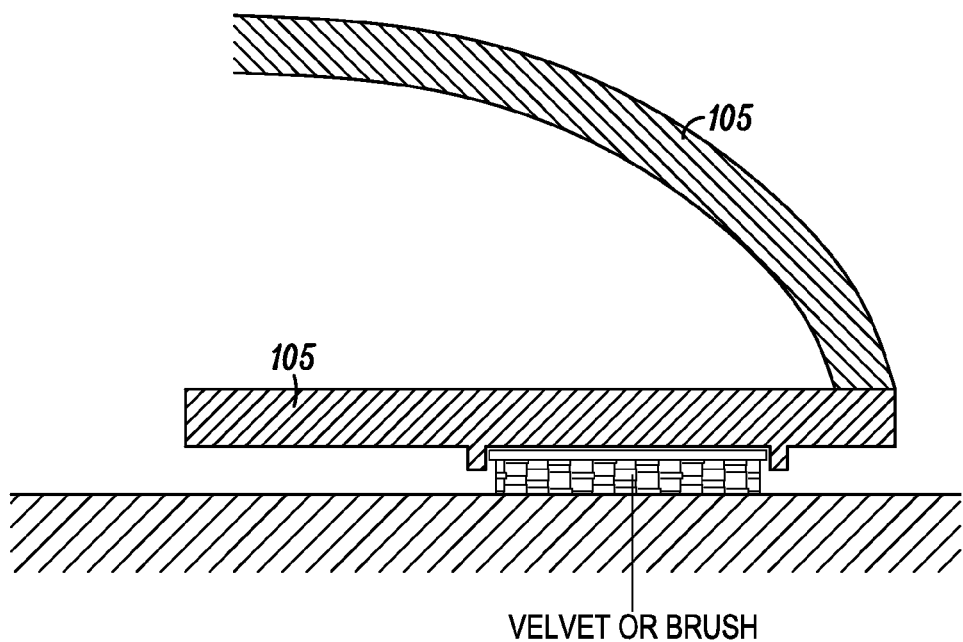
FIG. 2 illustrates a side view of a portion of a mouse in accordance with an embodiment of the present invention.

FIG. 2 illustrates a mouse in accordance with an embodiment of the present invention. In one embodiment, materials which have small hair-like texture are used to reduce friction. Each hair flexes and jumps back independently, resulting in a very smooth movement without any stick-slip effect. Examples of such materials are velvet or brushes. A specific example of such a material is "Brushlon™" made by 3M (St. Paul, Minn.). In one embodiment, the brush-like material may be mounted with tilted hair so that a displacement in a specified direction results. In one embodiment, the crawling effect works best when the work surface 110 is very smooth and polished.

Various materials have been discussed above which can be used create and/or cover the feet of mice in order to reduce friction between the work surface and the mouse 100. Several other materials may also be used to achieve such a result. The effectiveness of any of these materials in reducing friction depends upon the material of the work surface, the condition of the work surface, and the condition of the material on the mouse feet itself.

Figure 3:
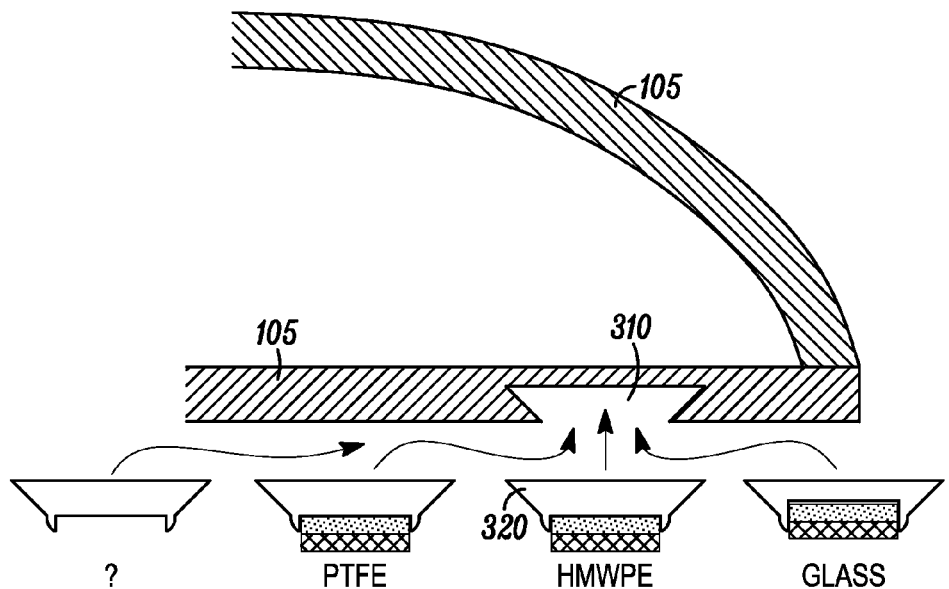
FIG. 3 illustrates a side view of a portion of a mouse with removable feet in accordance with an embodiment of the present invention.

In one embodiment, the user can change the feet of the mouse 110 when required. For example, the user may change the feet of the mouse when the material it is made of starts to wear out, when the condition/material of the work surface changes, or when the reduction of friction is not optimal for any other reason. One such embodiment where the user can change the feet of the mouse 100 is discussed in the context of FIG. 3. Such interchangeable feet are very useful when some feet 115 are made of some materials (e.g., glass) that work very well on some surfaces 110, but are really un-useable on other surfaces 110 (e.g., glass on glass).

In one embodiment, in the location of the feet, the mouse 100 has a dovetail joint female part 310. The feet are mounted on a small plastic support that includes the dovetail joint male part 320. The user can easily slide away the feet 115 of the mouse and replace them with new ones or ones with different materials that will perform better on the work surface he is using, etc. One of the advantages of the dovetail is that no tools are required to replace the feet. Further, the foot support can accommodate the various thicknesses of different foot structures. However, it is to be noted that any other assembly techniques known in the art can be used.

Figure 4A:
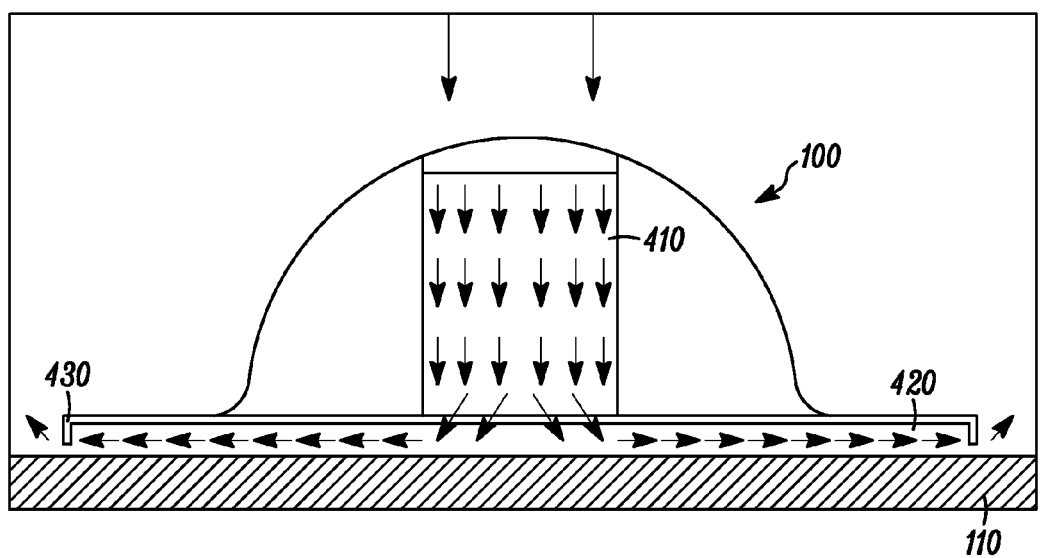
FIG. 4A illustrates a side view of a mouse with an air pump in accordance with an embodiment of the present invention.

In one embodiment, a cushion of air is created between the mouse 100 and the work surface 110 to reduce friction. FIG. 4A illustrates one such embodiment of the present invention. In one embodiment, a fan or other air pump (or air compressor) 410 takes air on the upper side of the mouse and, blows it on the bottom side. It is to be noted that the terms "fan", "air pump" and "air compressor" are used interchangeably herein. In one embodiment, the air is blown out approximately in the center of the bottom of the mouse. The air travels under the bottom side of the mouse and exits at the periphery of the "skirt" 420. At the edge, the path is narrowed by a "lip" 430 so that some pressure builds up underneath the mouse, resulting in a lift of the mouse. The active surface is increased due to the addition of the skirt 420, so that sufficient lift results even from a low pressure fan.

Figure 4B:
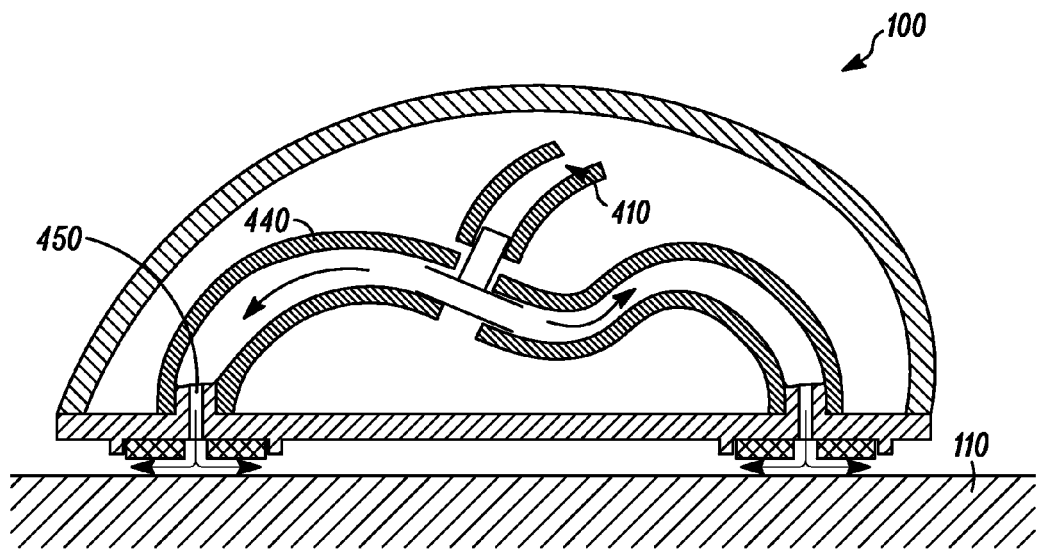
FIG. 4B illustrates a side view of a mouse with an air pump in accordance with an embodiment of the present invention.

FIG. 4B illustrates a mouse in accordance with another embodiment of the present invention, where air is used to reduce friction between the mouse 100 and the work surface 110. In one embodiment, a higher pressure pump 410 is used, and the "air-lubricated" surface is reduced accordingly and become closer to the current feet surface. Also, in on embodiment, smaller size pipes 440 are used for distribution. In one embodiment, the mouse feet are standard and have a hole 450 in the center to provide a path for the air. In other embodiments, the feet are made of low friction materials such as HMWPE and have a hole 450 in them. In yet other embodiments, the feet include an intermediate layer of foam 125 as described above between the case and the feet to accommodate possible parallelism and height errors between the mouse and the table. In such embodiments, the foam layer 125 also has a hole 450, along with the other layers comprising the feet 115 of the mouse.

Figure 4C:
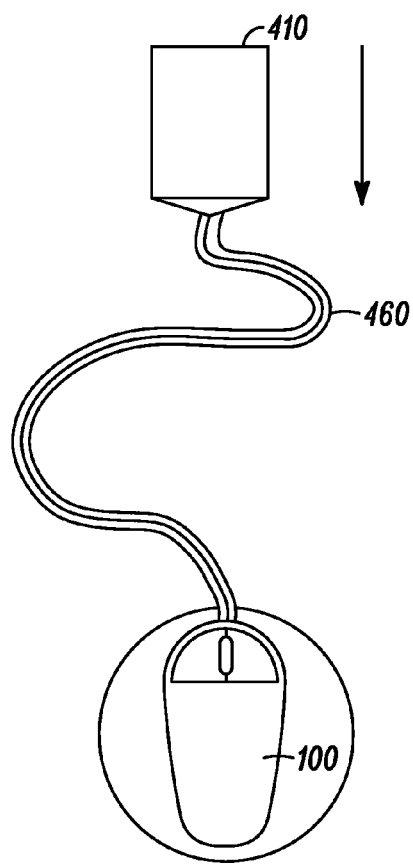
FIG. 4C illustrates a top view of a mouse with a remote fan in accordance with an embodiment of the present invention.

FIG. 4C illustrates a mouse in accordance with still another embodiment of the present invention. In one embodiment, in the case of a corded mouse, the fan/pump can be moved out of the mouse and connected through a pipe that is incorporated into the mouse cable. This reduces the space requirement inside the mouse 100. FIG. 4C shows a remote pump 410, and a flexible tube 460 connecting the remote fan 410 to the mouse 100.

In yet another embodiment, an air pump 410 is built into the mouse foot itself. This results in the absence of pump and pipes or air ducts between the pump and the foot. These pipes take space and create also pressure losses. In one embodiment, the work surface has air vents. Thus the air cushion is created through the work surface (e.g., mouse pad, an "air table", etc.), rather than through the mouse. This allows a mouse with smaller size. Further, a bulkier air pump is permissible since it is not part of the mouse 100. Moreover, it is relatively easier to manage the air pump, the pipes etc. It will be obvious to one of skill in the art that the air cushion between the mouse 100 and the work surface 110 can be created through the work surface (e.g., mouse pad), through the mouse 100, or through any combination of these.

In some embodiments, vibrations in the work surface or in the mouse are used as friction-reducing techniques. In one embodiment, low frequency macro-vibrations are used to reduce friction. In one embodiment, such macro-vibrations can be produced by rotating an off center mass, such as a weight attached to the shaft of a motor. The frequency of vibrations is the rotation speed of the motor. When low frequency vibrations are induced between the mouse 100 and the work surface 110, the mouse is continually moving relative to the table surface. As a result, the inevitable difference between static and dynamic coefficients of friction disappears just because the conditions for static are not applicable. This makes it much easier to position the cursor with precision. In one embodiment, such macro-vibrations are parallel to the plane of the motion of the mouse 100 over the surface 110. However, macro vibrations can become audible and can be unpleasant to the user. In one embodiment of the present invention, a layer or a noise-absorbent material (e.g., foam) 125 is introduced in the mouse feet to absorb such noise.

Figure 5A:
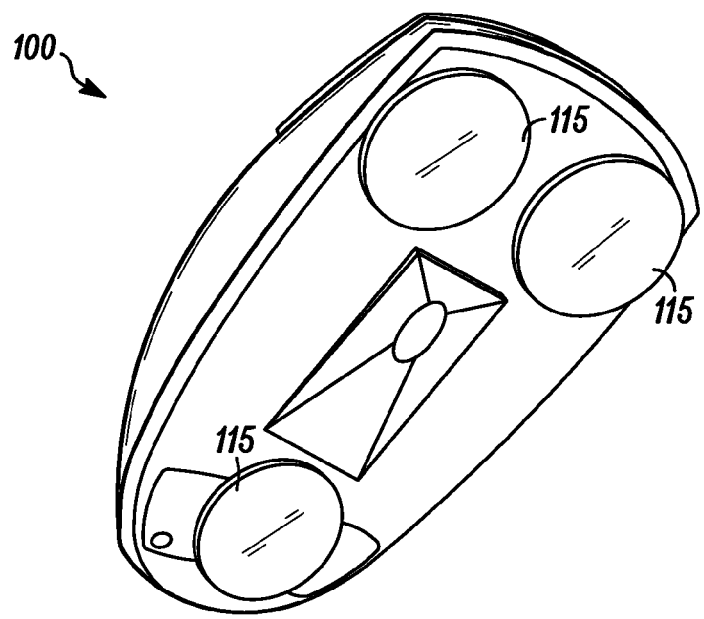
FIG. 5A illustrates a bottom view of a mouse with feet made of piezo-ceramic material in accordance with an embodiment of the present invention.

In another embodiment, ultrasonic squeeze films are used to reduce the friction between the mouse 100 and the work surface 110. In one embodiment, such vibrations are perpendicular to the plane of motion of the mouse 100 over the surface 110. FIG. 5A illustrates a mouse 100 in accordance with one such embodiment of the present invention. The mouse in FIG. 5A has three separate disc shaped feet 115 including a layer made of piezo-electric material. In one embodiment, this piezo-electric layer is bonded to another layer made of a different material. This is described in greater detail below. In another embodiment, mouse feet 115 are made of a stack that vibrates up and down (e.g., a stack of piezo layers). This is also described in greater detail below. Examples of the piezo electric material which can be used include piezo ceramic material used include PIC 151, PIC 155, PIC 255. In one embodiment, piezo-polymers can be used instead of piezo-ceramic materials. It is to be noted that other materials which can be stimulated similarly can also be used.

When one or more of these feet 115 are stimulated electrically at the correct frequency, they vibrate and trap a layer of air between them and the work surface 110. The air film appears due to the vibrations and the vibrations are too fast to allow the air to escape through the thin gap. This layer of air significantly reduces friction and the mouse 100 moves around on the work surface with only the slightest touch. The result is very similar to the situations above where a layer is created with a pump.

Figure 5B:
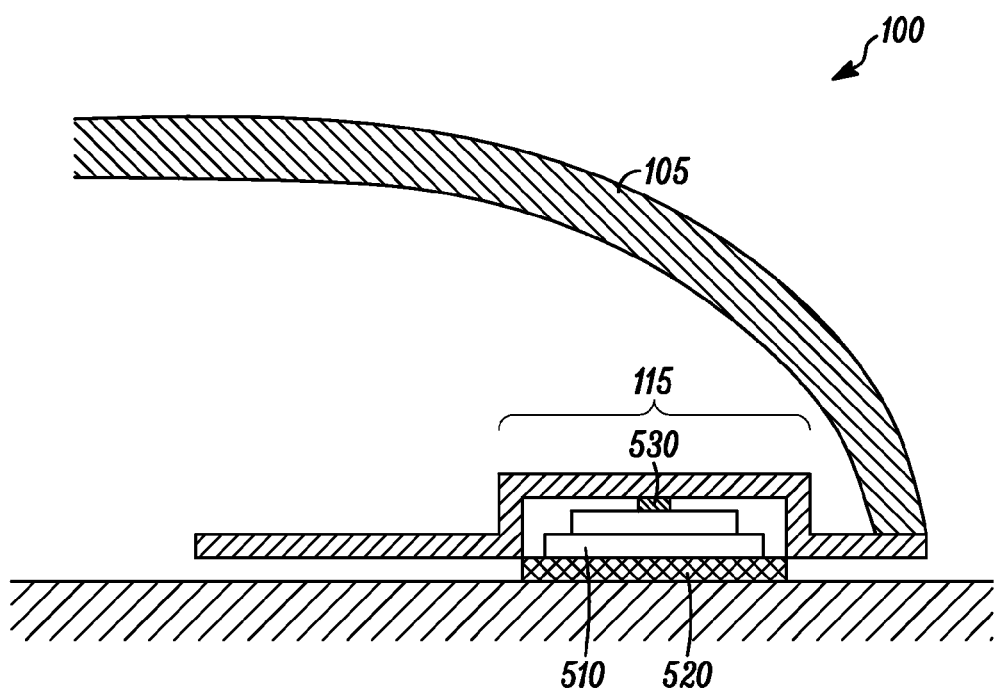
FIG. 5B illustrates a side view of a mouse with feet made of piezo-ceramic material in accordance with an embodiment of the present invention.

FIG. 5B shows a partial view of the mouse 110 with one of the feet 115 shown in some detail in accordance with an embodiment of the present invention. In this embodiment, a layer of piezo ceramic material 510 is bonded to a backing layer 520 made of another material. In this discussion, these layers are referred to as disks, but it is to be noted that these layers may have any shape (e.g., rectangular, elliptical, etc.). As shown in FIG. 5B, a piezo ceramic disk 510 is bonded to a backing disk made of another suitable material 520. In one embodiment, the backing disk 520 is made of glass. In another embodiment, the backing disk 520 is made of steel. In one embodiment, the piezo ceramic disk 510 and the glass disk 520 are of matching thickness. For example, each of these disks can be 1 mm thick. The piezo ceramic disk 510 has electrodes deposited onto it. In one embodiment, the electrodes on the piezo ceramic disks 510 are one on each side. In one embodiment, one wrap-around electrodes is used for single-sided wiring. It will be obvious to one of skill in the art that other oscillation modes and electrode configurations are possible. A piezo-support 530 for supporting the piezo ceramic disk 510 and the glass disk 520 attached to it can also be seen. A piezo electric driver (not shown) is used to apply a voltage between the electrodes. In one embodiment, to make the piezo layer oscillate, the voltage has to change over time (at the desired oscillation frequency). In one embodiment, Alternating Current (A/C) is used.

Figure 5C:
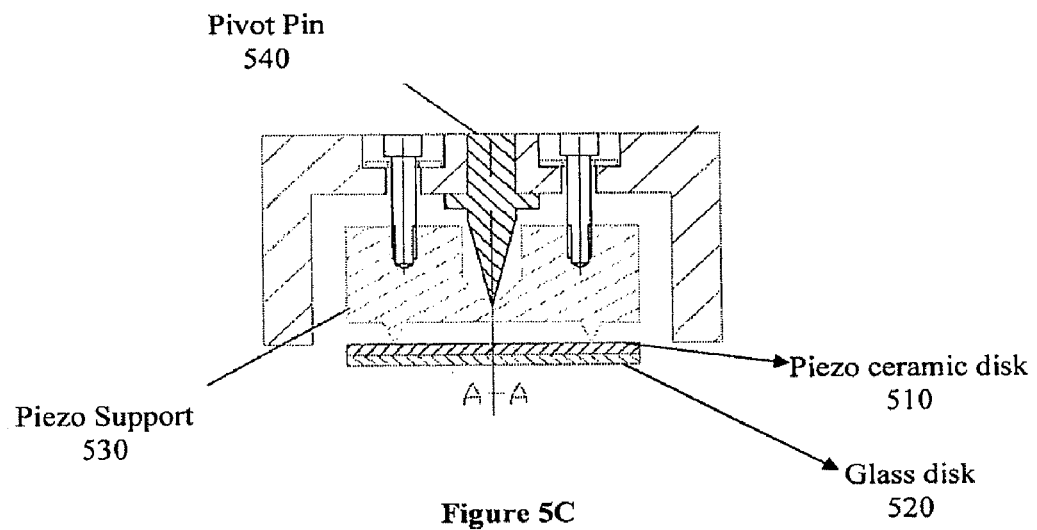
FIG. 5C illustrates a view of a foot of a mouse made of piezo-electric material in accordance with an embodiment of the present invention.
Figure 5D:
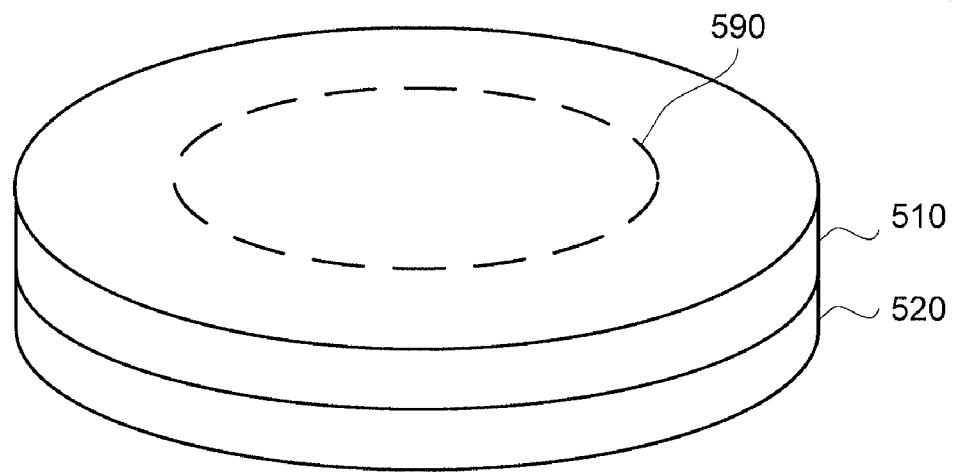
FIG. 5D illustrates a view of a piezo-electric disk in accordance with an embodiment of the present invention.

FIG. 5C illustrates in further detail the structure of the foot 115 in accordance with an embodiment of the present invention. At the bottom, there is the oscillating bonded disk: one layer of piezo ceramic 510 on top and one glass layer 520 on the bottom, glued together. When a voltage is applied between the electrodes, the piezo-ceramic 510 expands (or retracts) in diameter. The glass 520 being inert, the bonded disk deforms with the center slightly higher (or below) the edges and oscillating between these two positions (generally a few microns only). There is a circle (nodal circle) that remains fixed (but rotates slightly). This circle is where the support is in contact with the disk, so that it does not dampen the oscillations. The support is placed on a pivot pin 540 so that it can pivot around the tip of the pin and maintain the oscillating bonded disk flat on the surface 110 even if there are some irregularities. FIG. 5D illustrates a view of a piezo-electric disk in accordance with an embodiment of the present invention. The piezo-electric disk of FIG. 5D includes a piezo ceramic 510 to the lass layer 520 on the bottom, and the nodal circle 590 where the piezo-support 530 (not shown) may make contact with the piezo-ceramic 510 top.

Figure 6A:
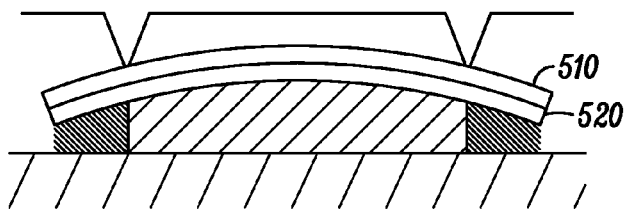
FIG. 6A illustrates a view of a portion of a foot of a mouse made of piezo-electric material in accordance with an embodiment of the present invention.
Figure 6A:
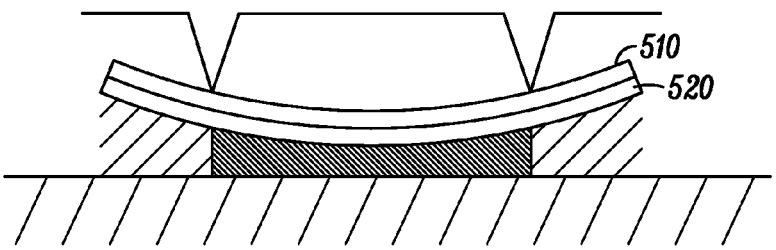

FIG. 6A illustrates the functioning of the piezo-electric feet 115 in accordance with an embodiment of the present invention. As mentioned above, a piezo ceramic disk 510 is bonded to a glass or steel disk 520. The two layers 510 and 520 are chosen, in one embodiment, to optimize bending of the joint disk. In one embodiment, the relative thicknesses of the two disks 510 and 520 are adjusted to optimize the deformations.

The piezo ceramic disk 510 is excited at a specific frequency. In one embodiment, the frequency of oscillation is above audible frequencies, so that it cannot be heard. In one embodiment, this frequency is slightly below ultrasonic frequency. When excited, the piezo ceramic-disk 510, expands and shrinks in diameter. The glass (or steel) 520 disk does not, resulting in a bending of the bonded disk. In an alternate embodiment, two ceramic disks can be bonded together in such a way that when voltage is applied, one shrinks and the other expands, resulting in increased bending effect. In this case, an additional low friction surface is added underneath in one embodiment. As can be seen in FIG. 6A, this results in a dilation and compression of the air under the foot 115.

Figure 6B:
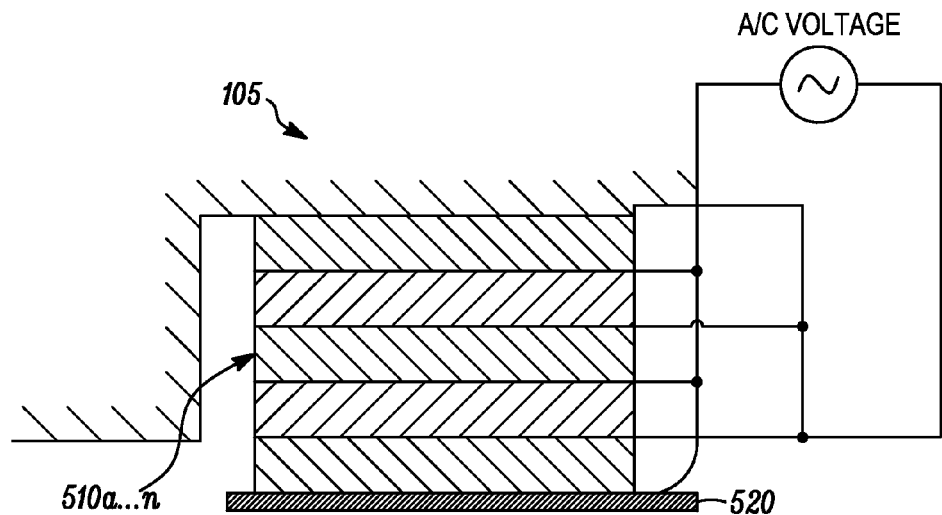
FIG. 6B illustrates a view of a portion of a foot of a mouse made of piezo-electric material in accordance with an embodiment of the present invention.

In one embodiment, several layers of piezo-electric elements $510a \ldots 510n$ can be stacked together, instead of a single piezo-electric disk 510, to increase the mechanical movements resulting from an electrical voltage being applied. This can be seen in FIG. 6B. The stack $510a \ldots 510n$ does not bend as described with reference to FIG. 6A above. Rather, the stack $510a \ldots 510n$ translates up and down with respect to the surface 110. If a single thick piezo electric disk 510 is used, the voltage required is very large. Making a stack $510a \ldots 510n$ allows for the layers to be connected in parallel. An example of the thickness of each layer in the stack $510a \ldots 510n$ is about 1 mm. In one embodiment, the electrodes of two adjacent piezo-electric layers are in contact, and the layers are assembled in alternating directions so that they all expand (or all contract) when a voltage is applied. In one embodiment, the piezo-electric stack $510a \ldots 510n$ is further bonded with the backing disk 520, so that the backing disk 520 can protect the fragile electrodes on the piezo elements $510a \ldots 510n$.

Figure 6C:
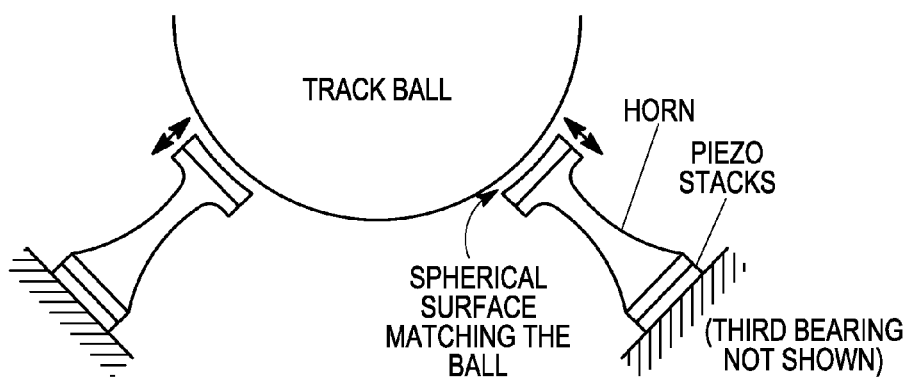
FIG. 6C illustrates a view of a trackball with bearings made of piezo-electric material in accordance with an embodiment of the present invention.

It is to be noted that several of the embodiments described herein can be implemented not only in mice, but in other input devices, such as trackballs as well. In the case of a trackball the surfaces in contact where the friction reduction is to be applied are the rotating ball and the bearings it is sitting on. For instance, in one embodiment, a trackball sits on three bearings. In several currently available trackballs (without friction reduction) these bearings are made of small ruby spheres (or another hard material). In order to implement a friction reduction on trackballs, in one embodiment, these bearings are replaced with spherical surfaces (e.g., 10 to 20 square mm) that match the radius of the ball and are driven by piezo elements to oscillate and create the lubricating air gap. In one embodiment, a "horn" is used to amplify the mechanical vibrations of a stack of piezo elements working in thickness mode. The "horn" is a well known method used in ultrasonic technology (for example in ultrasonic welding). Such an embodiment can be seen in FIG. 6C. While the surfaces in contact in a trackball are not in a plane but are spherical, the principles remain the same as those discussed in the rest of this document.

Figure 7A:
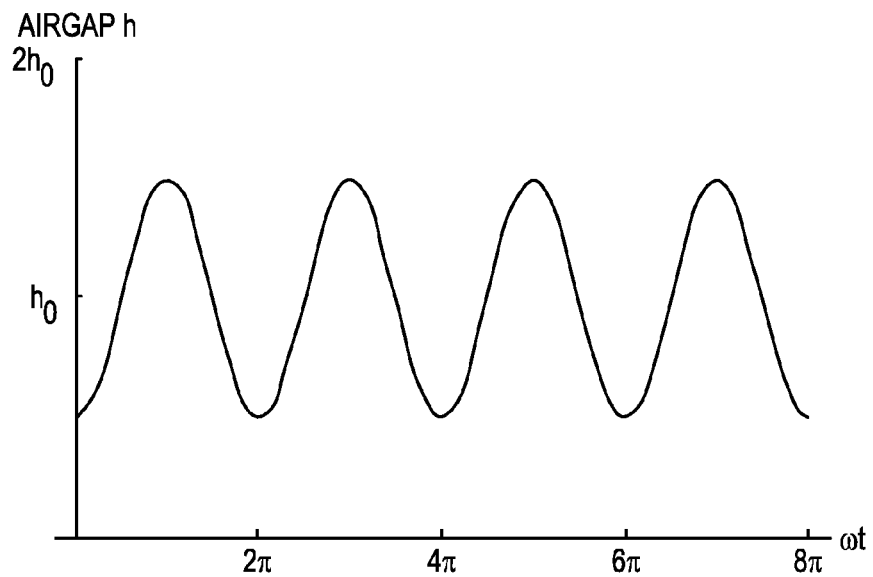
FIG. 7A illustrates a graph of airgap plotted against time.
Figure 7B:
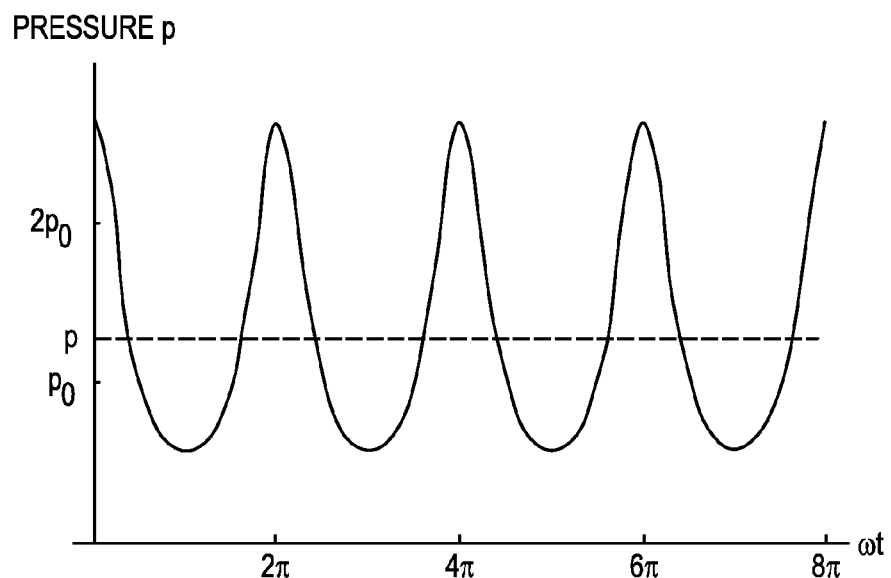
FIG. 7B illustrates a graph of pressure plotted against time.

Referring back to FIG. 6A, FIGS. 7A and 7B illustrate how the compression and dilation of air under the feet 115 of the mouse 110 illustrated in FIG. 6A results in reduced friction. FIG. 7A illustrates the airgap (the distance between the bonded disk and the work surface 110 plotted against time. FIG. 7B illustrates the pressure built up against time. By comparing FIGS. 7A and 7B, it can be seen that a decrease in the height of a portion of the mouse foot (i.e. compression) leads to an increase in pressure, while an increase in the height (i.e. dilation) leads to a decrease in pressure. It is important to note that the relationship between the airgap 'h' and the pressure 'p' is non-linear. A result of this non-linearity is a lift force. This is explained in greater detail in Chapter 2 of "Squeeze Film Air Bearings using Piezo-Electric Bending Elements" by Markus Wiesendanger, which is incorporated herein in its entirety.

In one embodiment, the frequency of the driving signal matches one of the resonance frequencies of the assembly in order to maximize the amplitude of oscillation. In one embodiment, the two disks 510 and 520 are attached along their nodal circle (the line that does not move; the vibration nodes) so that combined disk can oscillate freely. Such an attachment also allows the full foot assembly to pivot slightly to adapt to the table surface and sit perfectly flat with even contact pressure. As noted above, materials other than glass can be used for the backing disk, 520, as long as appropriate bending of the bonded disk is possible. Adjusting the diameter and the thicknesses of the two layers 510 and 520 are also ways to optimize the amplitude of deformation and the frequency of oscillation.

In one embodiment, each foot 115 has a separate oscillator/amplifier circuit tuned to resonance via a trimmer or by an automatic adjustment system. In one embodiment, a low voltage input is used, and inductor is used to raise the voltage at which the piezo ceramic disk 510 is stimulated. For example, the input voltage could be 24V, while the voltage at which the piezo ceramic disk 510 is stimulated is 200V.

In one embodiment, it is possible to turn around the system to include the elements creating the ultra sonic squeeze film in the working surface (e.g., a mouse pad). For example, the mouse pad would create the compressions and dilations described above, and thus the mouse pad would vibrate, rather than the mouse 100 vibrating. This will reduce the size of the mouse 100 and the power consumed by it. It is to be noted that any combination of such functionality in the mouse 100 and the working surface 110 can be created.

There are also several other ways in which friction between a mouse and the working surface can be reduced. For instance, in some embodiments friction can be reduced by creating uniform magnetic fields between the pad and the mouse so that the mouse is repulsed by the pad over the full surface of the pad. In another embodiment, the mouse uses wheels to reduce friction. In many cases, normal wheels are not the wheels of choice because of their directive effect. Some manufacturers sell special rollers for conveyor belts that include at their periphery a set of wheels that allow a free movement in a direction parallel to the axis of the wheel. Such wheels (or assemblies of wheels) can move freely in any direction.

Above, various ways of reducing the friction between the mouse 100 and the working surface 110 have been discussed. However, reducing the friction between the mouse and the working surface very significantly (e.g., to almost zero) can be problematic in some situations. For example if the user releases her/his mouse, the slope of the table can be sufficient (even though it may otherwise be unnoticeable) for the mouse to move by its own weight and gravity. This can be a problem if the mouse goes too far and even if the displacements are limited it can be annoying to search for the mouse after leaving it in one place. As another example, with tremendously reduced friction, even double clicking at one spot may be problematic because the mouse moves too easily.

Figure 8:
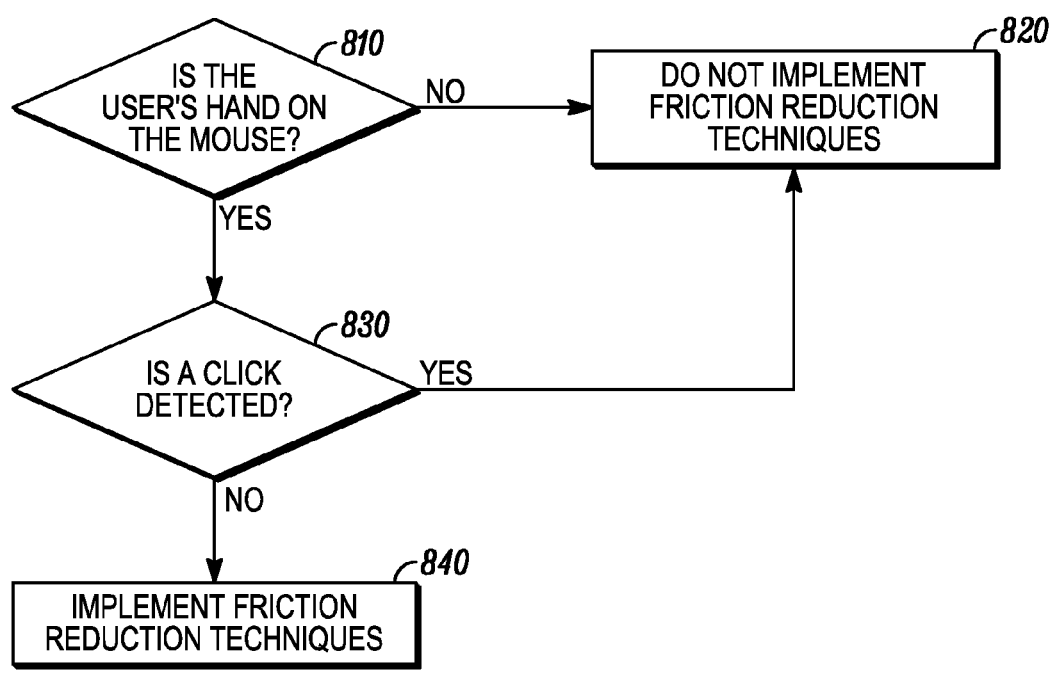
FIG. 8 illustrates a flowchart of an algorithm for determining when low friction is appropriate in accordance with an embodiment of the present invention.

Thus, in some embodiments of the present invention, an intelligent algorithm is incorporated into the mouse 100, based on which the device can determine whether and/or by how much the friction should be reduced. FIG. 8 is a flowchart which illustrates the functioning of such an intelligent algorithm in accordance with an embodiment of the present invention. In one embodiment, this intelligence can be located in the mouse 100. In another embodiment, this intelligence can be located in the host (e.g., personal computer) with which the mouse 100 interacts. In yet another embodiment, the intelligence resides partly in the mouse 100 and partly in the host.

As can be seen from FIG. 8, the system first checks (step 810) to see whether the user's hand is on the mouse. If it is determined that the user's hand is not on the mouse, then friction reduction techniques to reduce friction between the mouse 100 and the work surface 110 are not implemented (step 820), since in such a situation reduced friction may result in the mouse wandering away from where the user had left it.

If it is determined that the user's hand is not on the mouse, then the system checks (step 830) to see whether a click is detected. If a click is detected, then the friction reduction techniques are not implemented (step 820). Alternately, the friction reduction mechanism is disabled if it is already being implemented. This ensures that, in case the user is attempting a double click, the mouse does not move between the two clicks. If a click is not detected, then the friction reduction techniques are implemented (step 840). It is to be noted that in various embodiments of the present invention, friction reduction techniques can be partly implemented (rather than completely disabled), so as to get controllably variable amounts of friction.

It is to be noted that the specific criteria used to determine whether or not to reduce friction are different in various embodiments from those illustrated in FIG. 8. For instance, in other embodiments, instead of, or in addition to the click, other mouse activities (e.g., switch use, roller use, etc.) can be used to disable or not implement friction reduction. Moreover, in one embodiment, the non-implementation of friction reduction techniques has to extend for few milliseconds after such activity has been detected (e.g., to facilitate a drag and drop operation).

The implementation of implementing friction reduction techniques (step 840) and not implementing them (step 820) as required is discussed below in the context of specific embodiments of the present invention. In one embodiment, where friction reduction is implemented by oscillations of piezo ceramic disks, the above problems can be addressed by controlling the power applied to the piezo so that its oscillations are reduced or even stopped when the friction does not need to be reduced. In another embodiment, the driving electronics used to measure the signal on the piezo (amplitude and current) are monitored. This signal changes a lot when airlift starts or stops because the mechanical contact between the foot and the table significantly affects the piezo impedance and its resonance frequency. By monitoring this signal it is possible to drive the piezo so that the system remains a little bit below lift start point, independently of the load on the mouse (user's hand weight). The slight remaining friction prevents the mouse from "flying away".

As mentioned above, another possible problem can occur when the user attempts to make a "double click". If the friction of the mouse on the table is null, the hand movement of the first click will move the mouse, making it impossible for the second click to occur in the same position as the first one. In one embodiment, this problem is addressed by reducing the piezo drive power when a button action is detected.

Figure 9A:
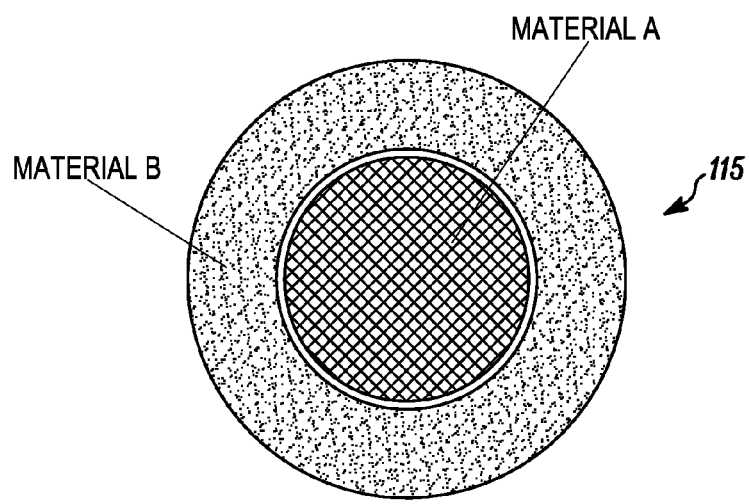
FIG. 9A illustrates a cross-sectional view of a foot of a mouse made of two different materials in accordance with an embodiment of the present invention.

FIGS. 9A-9F illustrate other embodiments in which friction can be controlled. As seen in FIG. 9A, the foot 115 of the mouse can be made of two (or more) different materials having different coefficients of friction. One material (material A) can be a low friction material, such as PTFE. The other material (material B) can be a higher friction material, such as high friction molded plastic. In the embodiment shown in FIG. 9A, the low friction material is in the center, and the higher friction material is around it. It is to be noted that this particular arrangement is just an example, and various different arrangements of these materials are possible in different embodiments. For instance, several segments of material A can be interspersed with several segments of material B.

Figure 9B:
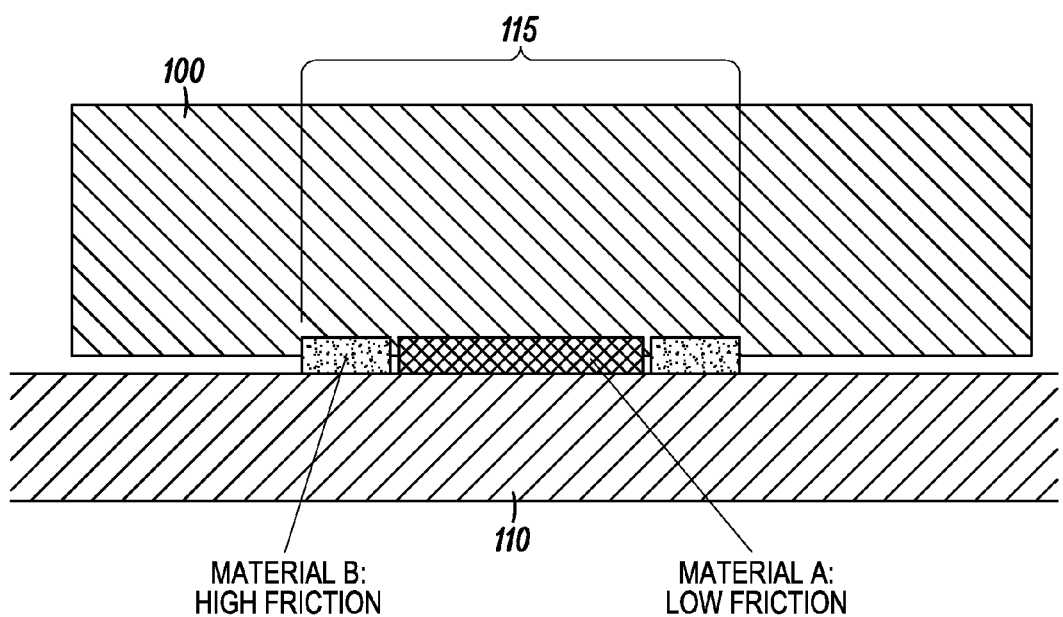
FIG. 9B illustrates a side view of mouse with a foot of a mouse made of two different materials in accordance with an embodiment of the present invention.

The foot 115 shown in FIG. 9A is shown along with mouse 100 and work surface 110 from a different perspective in FIG. 9B. The relative positions of the portions of the foot 115 made with material A and material B can be adjusted. This adjustment can occur by various means, such as a simple mechanical way. One example of such a mechanical attachment is the use of springs, which is discussed in more detail below, with reference to FIG. 9E. Another example is using a lever to switch from one material to another.

Figure 9C:
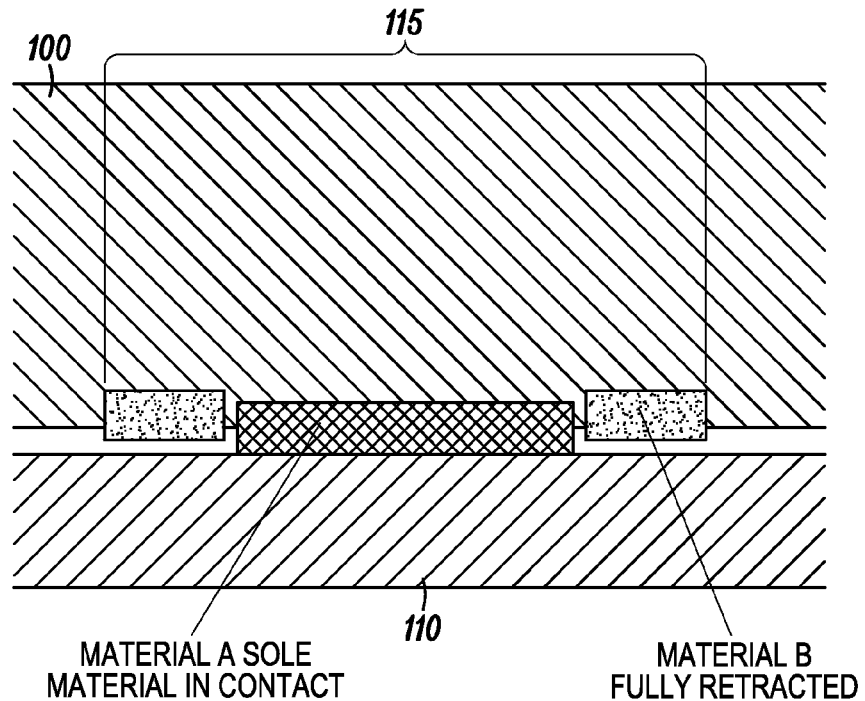
FIG. 9C illustrates a cross-sectional view of a foot of a mouse made of two different materials in accordance with an embodiment of the present invention.
Figure 9D:
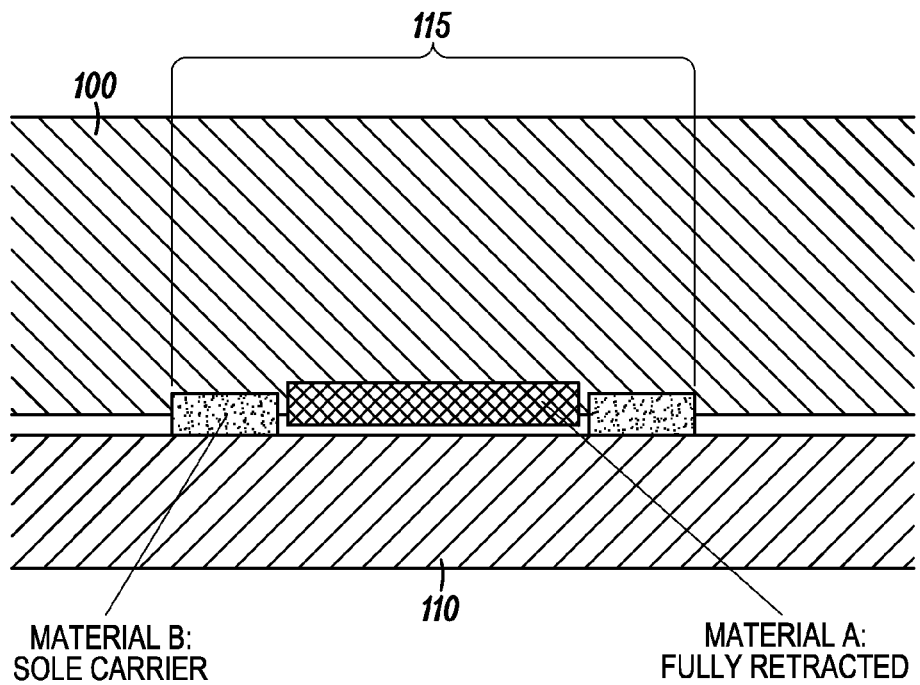
FIG. 9D illustrates a cross-sectional view of a foot of a mouse made of two different materials in accordance with an embodiment of the present invention.
Figure 9E:
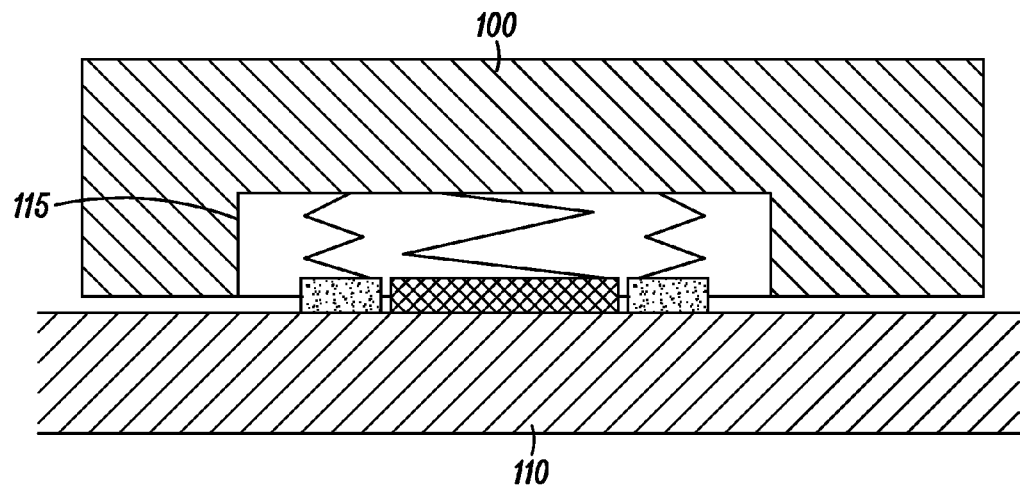
FIG. 9E illustrates a cross-sectional view of a foot of a mouse made of two different materials and attached springs, in accordance with an embodiment of the present invention.

This would make it possible to have several different modes with different levels of friction. FIG. 9C illustrates a low friction mode, since only material A is in contact with the work surface 110. Material B is fully retracted. FIG. 9D illustrates a high friction mode, since only material B is in contact with the work surface 110, and material A is totally retracted. The friction level can be adjusted, in one embodiment, to various levels in between, since the amount of friction drag generated by a material is proportional to the amount of force with which the material is pressed against the surface 110 and the material's coefficient of friction. As illustrated in FIG. 9E, a simple spring based mechanism is used in one embodiment to adjust the fraction of the total mouse weight taken by each material. By mounting the foot materials on spring mountings, the fraction of the total weight taken by each foot material can be adjusted by changing the compression on each spring. This will result in different friction levels between the feet 115 of the mouse 100 and the work surface 110. In one embodiment, the spring compression is altered by a simple manual screw mechanism turned by the user. In another embodiment, the spring compression is altered by an actuator in the mouse 100. In one embodiment, the user could use the software and/or firm ware to choose whether to alter the spring compression manually or by using the actuator. Moreover, in one embodiment, the spring compression is controlled by the actuator, and the actuator is controlled by the user via software/firmware. In yet another embodiment, an intelligent algorithm controls the spring compression automatically.

Figure 9F:
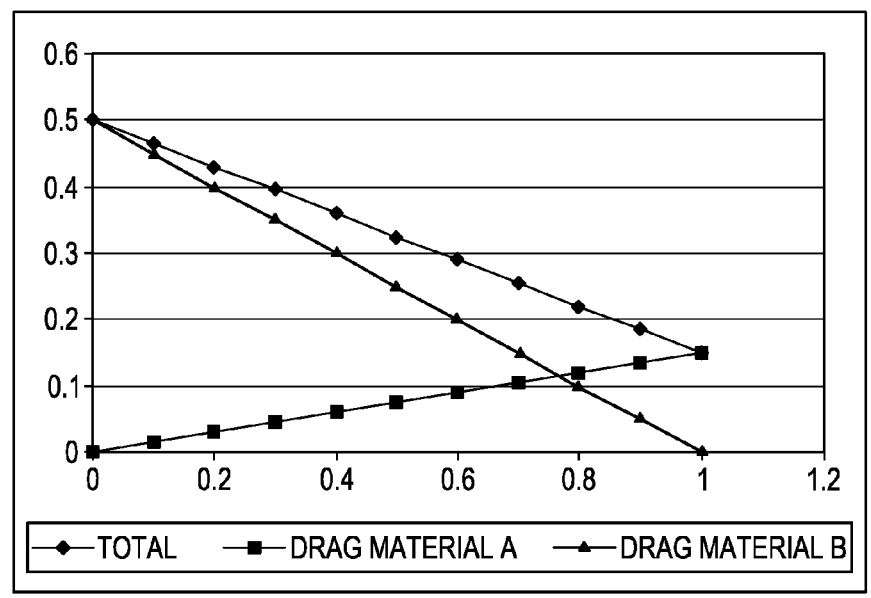
FIG. 9F illustrates a graph of the drag of a first material, a drag of a second material, and the total drag.

As can be seen from FIG. 9F, the total friction drag is the sum of the friction from material A and material B. As the amount of weight of the mouse 100 supported by material A increases, the amount of weight of the mouse 100 taken by material B decreases, there by changing the total foot friction. The X axis is the part of the load pressing on material A. When this is zero, all the load is supported by material B and the friction is the one of material B. When this is 1, then all the load is supported by material A and the friction is the one of material A. Various intermediate values are possible.

Figure 9G:
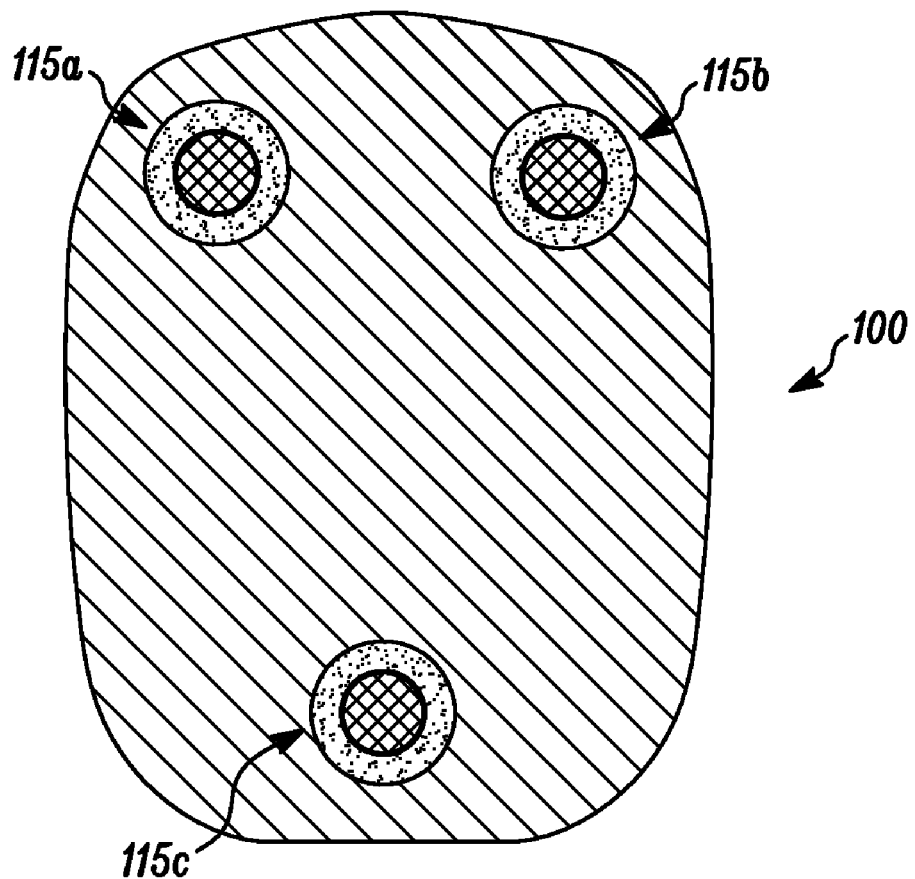
FIG. 9G illustrates a bottom view of a mouse with feet made of two different materials, in accordance with an embodiment of the present invention.

FIG. 9G is the bottom view of a mouse 100 with three feet 115, each of which is made of materials A and B as discussed above. In one embodiment, by adjusting all three feet 115 simultaneously, the total friction of the mouse can be altered. In one embodiment, by adjusting the friction of the individual feet 115 to different levels, the feel and balance of the mouse could be altered to suit the user's requirements. For instance, by having higher friction for the front feet 115a-b than for the rear foot 115c, the centre of rotation of the mouse could be altered. This type of friction tuning is more versatile than weight tuning of mice.

An example of an application of such embodiments is in the gaming environment. Gamers often need mice to have more or less friction depending on the specific requirements at any time (e.g., speed, accuracy, etc.). It is to be noted that while the discussion above is about a mouse with different materials on its feet, a similar embodiment could involve different materials on the work surface (e.g., mouse pad). The embodiments described above could be implemented with the input device alone, the work surface alone, or as a combination of the two.

Some available gaming mouse mats are made of different materials on each side, with desired properties, e.g. one side for speed, one side for accuracy. However, speed and accuracy characteristics are dependent on not only the friction coefficients of the materials in contact, but also upon the slip stick characteristics of these materials. By using the two-material foot design described above, two materials can be combined together to achieve a much wider range of desired speed or accuracy characteristics than the one that can be obtained by using available gaming mouse mats.

While particular embodiments and applications of the present invention have been illustrated and described, it is to be understood that the invention is not limited to the precise construction and components disclosed herein and that various modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. An input device communicatively coupled to a host, wherein a movement of the input device is measured relative to a surface upon which the input device is placed, wherein friction between the input device and the surface is dynamically reducible, the input device comprising:
    a housing;
    a foot which rests on the surface, the foot comprising:
    a first layer of a piezo-electric material to which an AC voltage is applied;
    a second layer bonded to the first layer, wherein the second layer is a different material than the first layer, wherein the application of the AC voltage results in a layer of air being trapped between the foot and the surface, wherein the layer of air reduces the friction from a first amount of friction to a second amount of friction between the input device and the surface, wherein the first amount of friction is an amount of friction without the air being trapped by application of the AC voltage, and wherein the movement of the input device is measured relative to the surface; and a piezo-support configured to contact the first layer at a nodal circle, wherein the piezo-support is configured to support the first layer without dampening oscillations in the second layer.

2. The input device of claim 1, wherein the applied AC voltage deforms the first layer and the second layer.

3. A method for dynamically reducing friction between an input device and a surface on which the input device is placed, the method comprising:

periodically determining whether low friction between the input device and the surface is appropriate;

in response to determining that low friction is appropriate, implementing friction reduction techniques to reduce friction between the input device and the surface including applying AC voltage to a layer of piezo-electric material, which forms a portion of a foot of the input device, and thereby trapping air between the foot and a surface contacting the foot, wherein the portion of the foot of the input device further includes a piezo-support configured to contact the piezo-electric material at a nodal circle, wherein the piezo-support is configured to support the piezo-electric material without dampening oscillations in a second layer, wherein the second layer is bonded to the piezo-electric material, and wherein the second layer is a different material than the piezo-electric material; and in response to determining that low friction is not appropriate, not implementing friction reduction techniques.

4. The method of claim 3, wherein the step of determining whether low friction between the input device and the surface is appropriate comprises detecting at least one of a group comprising of: a user's hand being placed on the input device; a button on the input device being clicked; a roller activity; and a mouse movement.

5. The method of claim 3, wherein the step of implementing friction reduction techniques further comprises: waiting for a predetermined amount of time prior to implementing the friction reduction techniques.

6. The input device of claim 1 wherein the piezo-support is placed on a tip of a pivot pin.

7. The input device of claim 1 wherein the friction further comprises vibrations that are perpendicular to the plane of motion of the input device over the surface.

8. The input device of claim 1 wherein the second layer comprises at least one of glass or steel.

9. The input device of claim 3 wherein the piezo-support is placed on a tip of a pivot pin.

10. The input device of claim 3 wherein the friction further comprises vibrations that are perpendicular to the plane of motion of the input device over the surface.

11. The input device of claim 3 wherein the second layer comprises at least one of glass or steel.

12. A method of dynamically controlling the friction between an input device and a surface on which the input device is placed, the method comprising:

determining whether a user's hand is placed on the input device;

in response to the determination that the user's hand is placed on the device, determining whether a click of a button of the input device is detected;

in response to the determination that the click of a button has not been detected, reducing the friction between the input device and the surface upon which it is placed including applying AC voltage to a layer of piezo-electric material, which forms a portion of a foot of the input device, and thereby trapping air between the surface and the foot, which is configured to contact the surface, wherein the portion of the foot of the input device further includes a piezo-support configured to contact the piezo-electric material at a nodal circle, wherein the piezo-support is configured to support the piezo-electric material without dampening oscillations in a second layer, wherein the second layer is bonded to the piezo-electric material, and wherein the second layer is a different material than the piezo-electric material.

13. The input device of claim 12 wherein the piezo-support is placed on a tip of a pivot pin.

14. The input device of claim 12 wherein the friction further comprises vibrations that are perpendicular to the plane of motion of the input device over the surface.

15. The input device of claim 12 wherein the second layer comprises at least one of glass or steel.

* * * * *